(12) United States Patent
Künzler et al.

(10) Patent No.: US 8,174,434 B2
(45) Date of Patent: May 8, 2012

(54) METHOD AND DEVICE FOR DETERMINING A DISTANCE TO A TARGET OBJECT

(75) Inventors: Frank Künzler, Kraichtal (DE); Udo Haberland, Holzgerlingen (DE); Robert Rehner, Nuremberg (DE); Jochen Weinzierl, Nuremberg (DE); Lorenz-Peter Schmidt, Heßdorf (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 897 days.

(21) Appl. No.: 11/919,555

(22) PCT Filed: Apr. 27, 2006

(86) PCT No.: PCT/EP2006/003910
§ 371 (c)(1),
(2), (4) Date: Oct. 30, 2007

(87) PCT Pub. No.: WO2006/117125
PCT Pub. Date: Nov. 9, 2006

(65) Prior Publication Data
US 2010/0007548 A1    Jan. 14, 2010

(30) Foreign Application Priority Data

May 4, 2005   (DE) .......................... 10 2005 021 882

(51) Int. Cl.
*G01S 13/36*    (2006.01)
*G01S 13/00*    (2006.01)
(52) U.S. Cl. ........ 342/127; 342/118; 342/128; 342/175; 342/195
(58) Field of Classification Search ............. 342/27, 342/28, 70–72, 82–103, 127–133, 145, 175, 342/189–197; 180/167–169; 701/300, 301; 356/4.01–5.15
See application file for complete search history.

(56) References Cited

U.S. PATENT DOCUMENTS 4,146,328 A * 3/1979 Hullein et al. ............... 356/5.11
(Continued)

FOREIGN PATENT DOCUMENTS

DE    27 45 553    5/1978
(Continued)

OTHER PUBLICATIONS

Huder, Bernhard "Einführung in die Radartechnik" B.G. Teubner Stuttgart, Leipzig 1999.

(Continued)

*Primary Examiner* — Bernarr Greggory
(74) *Attorney, Agent, or Firm* — Paul Vincent

(57) ABSTRACT

An apparatus and a method for determining a distance (r) to a target object (200) proposes transmitting electromagnetic waves in the form of a transmission signal (120a) by a transmitter (111a), receiving at least one part of said transmission signal (120a) reflected by a the target object (200) in the form of a reception signal (120c, 120d) by receiving device (111b) and evaluating the reception signal (120c, 120d) according a reference signal (1230b) which has a known phase difference with respect to the transmission signal (120a) and a frequency equal to the frequency thereof. The reference (120) and reception (120c, 120d) signal frequencies are reduced in a frequency divider (113) with the same predefined divider factor (x) while preserving the existing phase difference between the reference signal (120b) and the reception (120c, 120d) signal in such a way that a reduced frequency reception signal (120b') and a reduced frequency reception signal (120d) are obtained. The frequency difference between the reduced frequency reception signal (120b') and reduced frequency reception signal (120d') is evaluated in order to determine the distance (R).

17 Claims, 2 Drawing Sheets

U.S. PATENT DOCUMENTS

| | | | |
|---|---|---|---|
| 5,162,862 A | | 11/1992 | Bartram |
| 5,194,906 A | * | 3/1993 | Kimura et al. ............... 356/5.11 |
| 5,387,918 A | * | 2/1995 | Wiesbeck et al. ............ 342/128 |
| 5,400,034 A | | 3/1995 | Smith |
| 5,400,130 A | * | 3/1995 | Tsujimoto et al. ........... 356/5.01 |
| 5,844,519 A | | 12/1998 | Heierli |
| 6,115,114 A | | 9/2000 | Berg |
| 6,121,915 A | | 9/2000 | Cooper |

FOREIGN PATENT DOCUMENTS

| | | |
|---|---|---|
| JP | 04 052 586 | 2/1992 |
| WO | WO 2004/025322 | 3/2004 |

OTHER PUBLICATIONS

Jensen J.F. et al., "Bandpass delta-sigma modulators for direct IF and RF sampling digital receivers implemented in InPHBT IC technology", IEE Conference Publication: Third International Conference on Advanced A/D and D/A Conversion Techniques and their Applications, No. 466, Jul. 28, 1999, p. 34-37.

Earl G.F. et al., "HF radar ADAC dynamic range requirements", IEE Conference Publication: Third International Conference on Advanced A/D and D/A Conversion Techniques and their Applications, No. 466, Jul. 28, 1999.

* cited by examiner

METHOD AND DEVICE FOR DETERMINING A DISTANCE TO A TARGET OBJECT

This application is the national stage of PCT/EP2006/003910 filed on Apr. 27, 2006 and also claims Paris Convention priority of DE 10 2005 021 882.2 filed on May 4, 2005.

BACKGROUND OF THE INVENTION

The invention concerns a method for determining a distance to a target object, wherein electromagnetic waves in the form of an outgoing signal are transmitted by a transmitter and at least one part of the outgoing signals is reflected on the target object and is received by a receiver as an incoming signal, wherein evaluation of the incoming signal takes place as a function of a reference signal, with the reference signal having a known phase difference with respect to the outgoing signal and the same frequency as the outgoing signal.

The invention further relates to a device for determining a distance to a target object as claimed.

Conventional methods and devices of this type use a phase difference between an incoming signal and a reference signal caused by the different signal path lengths of the outgoing and incoming signals and the reference signal to determine the distance to the target object. However, the accuracy of such a distance determination is only within one wavelength of the incoming signal used.

With another known method, an outgoing signal with increasing frequency, a so-called chirp signal, is transmitted and correlated with a corresponding incoming signal reflected on a target object. The differential frequency of both signals is proportional to the distance of the target object. Particularly disadvantageous in this method is the spatial resolution for determination of the distance of the target object which, at a frequency of the outgoing signal of approximately 24 GHz and with a chirp bandwidth of approximately 200 MHz, amounts to only approximately 0.75 m. With a typical evaluation in the spectral range, position accuracies in the decimeter region can be achieved. For many close-range applications, such as for distance detection in the field of motor vehicles, such low spatial resolution and position accuracy are unsuitable.

Accordingly it is the object of the present invention to improve a method and a device of the above-mentioned kind such that both the range accuracy as well as the position resolution or accuracy of the distance determination can be improved without simultaneously increasing the complexity of the device required for this purpose.

SUMMARY OF THE INVENTION

This object according to the invention is solved with a method of the above mentioned kind while maintaining a phase difference which exists between the reference signal and the incoming signal, the frequency of the reference signal and of the incoming signal being reduced in a frequency divider by the same pre-determinable divider factor in order to obtain a frequency-reduced reference signal and a frequency-reduced incoming signal and the phase difference between the frequency-reduced reference signal and the frequency-reduced incoming signal is evaluated in order to determine the distance.

Through the reduction of the frequency of the incoming signal and the reference signal according to the invention by the pre-determinable divider factor, a magnification of the respective wavelengths of the incoming signal and of the reference signal corresponding to the divider factor is obtained, as a result of which the accuracy of the distance determination is likewise magnified. Thus, by means of the evaluation of the phase difference between the frequency-reduced reference signal and the frequency-reduced incoming signal, a distance determination can be carried out which is improved compared with the prior art.

With an advantageous embodiment of the method according to the invention, the incoming signal is amplified before it is supplied to the frequency divider in the form of an amplified incoming signal. Through this measure, a dynamic range for processing the incoming signal is magnified, as a result of which a corresponding magnification of the distance range to be sensed is obtained.

In a particularly practical further embodiment of the present invention, the incoming signal and/or the reference signal is converted into a digital signal to obtain simple further processing of the respective signal and reduced susceptibility to errors compared with an analog signal. For conversion, a Schmitt-trigger or a comparator can e.g. be used. Suitably fast components with low divider factors, with even the already frequency-reduced signals still having frequencies in the gigahertz range, are e.g. obtainable from the field of optical telecommunications.

A conversion of the incoming signal and/or of the reference signal into a digital signal is more preferably highly advantageous for the frequency dividing according to the invention, since, in this case, the frequency divider can be designed in a particularly simple manner. For example, with this inventive version, a simple binary counter can be used as the frequency divider.

With the frequency division according to the invention, an output voltage which is proportional to the phase difference between the frequency-reduced reference signal and the frequency-reduced incoming signal can be obtained from the frequency-reduced reference signal and the frequency-reduced incoming signal by means of a phase comparator. This output voltage can then be digitized, for example using an analog/digital converter, and subsequently supplied to a computation unit for further processing. More preferably, the output voltage is evaluated for determining the distance of the target object, which, for example, can take place via a micro controller or a digital signal processor (DSP).

With a sufficiently great processing speed of the computation unit, e.g. in the case of a fast DSP, or with a sufficiently large divider factor of the frequency divider, it is also possible to directly supply the incoming signals and reference signals, available as digital signals, to suitable inputs of the DSP which for example periodically scans the signals interrupt-controlled and determines their phase difference through computation. A separate phase comparator is therefore unnecessary.

An additional version of the method according to the invention is characterized in that the outgoing signal and/or the reference signal are/is generated by means of an electrically tunable oscillator also called VCO (voltage controlled oscillator). The signal frequency in this case is more preferably selected or set as a function of the input voltage that can be supplied to the oscillator.

With a further very advantageous embodiment, different path lengths of the outgoing signal and/or of the incoming signal and/or of the reference signal and/or time delay differences of the signals caused, for example, preferably by an amplifier provided for amplification of the incoming signal and which occur within a device used for distance determination are compensated for.

Such time delay differences can for example occur due to different propagation conditions in different wave guides or a group time delay of an amplifier and the like, and are undesirable since these subject the distance information between the incoming signal and the reference signal contained in the phase difference to error.

To further increase the precision of the method according to the invention it is proposed to successively transmit several outgoing signals with different frequencies. For example 2 outgoing signals of different frequency are sufficient to improve the range accuracy already magnified by the frequency dividing by the divider factor according to the invention during determination of the distance of the target object from the phase difference between the incoming signal and the reference signal.

A device according to the claims is proposed as a further solution to the object of the present invention. Advantageous embodiments of the device according to the invention are the subject of dependent claims.

BRIEF DESCRIPTION OF THE DRAWING

Further characteristics, advantages and embodiments of the present invention are stated in the following figure description making reference to the drawing, wherein.

DESCRIPTION OF THE PREFERRED EMBODIMENT

Figure 1:
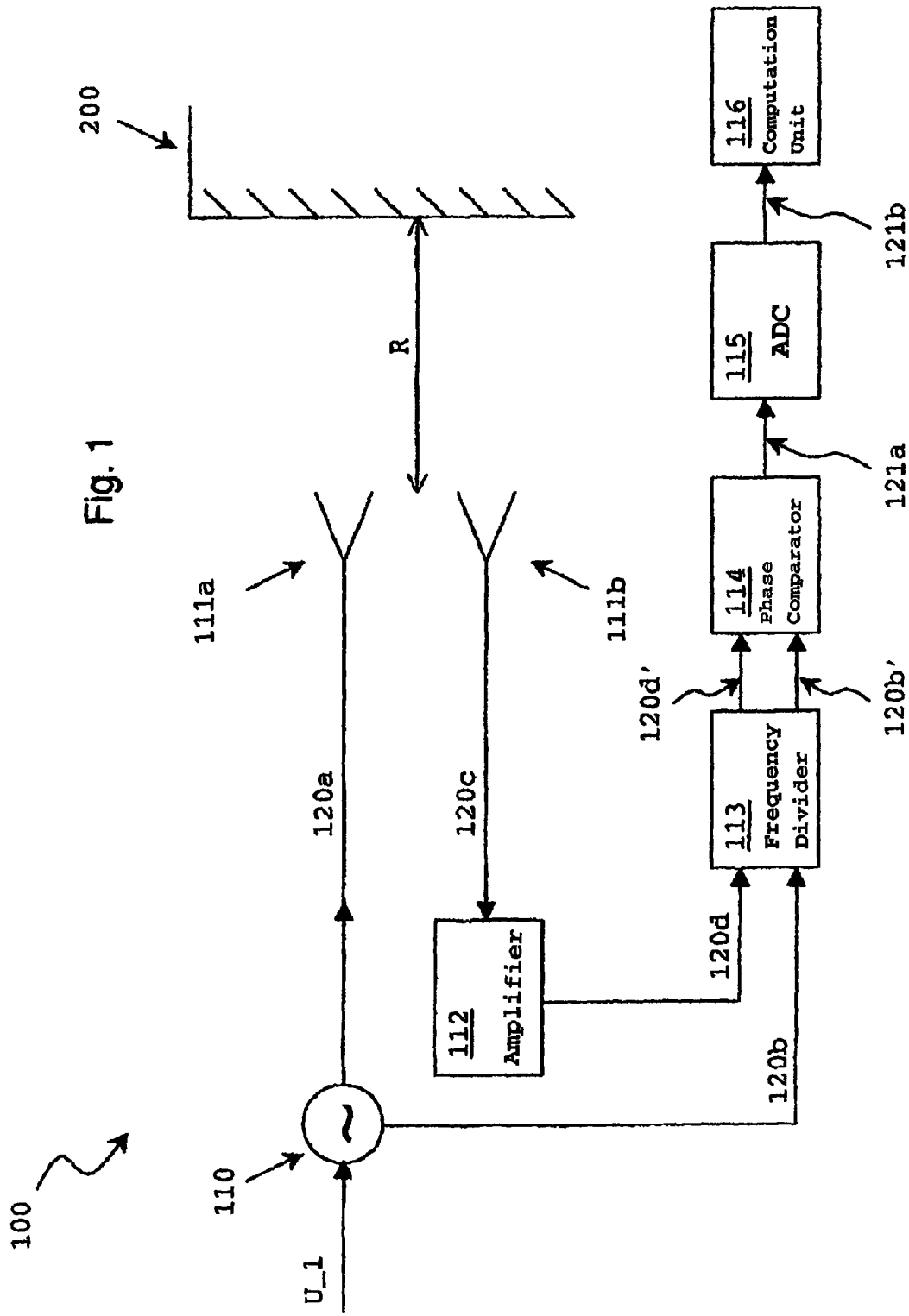
FIG. 1 shows an embodiment of the device according to the invention.

FIG. 1 shows a device 100 according to the invention, which is provided for determining a distance R to a target object 200. Towards this end, the device 100 has a transmitter 111a for transmitting electromagnetic waves in the form of an outgoing signal 120a supplied to the transmitter. The transmitter 111a can for example be a horn or a patch antenna. To amplify the outgoing signal 120a, the transmitter 111a can also have a high-frequency amplifier not shown in FIG. 1 if appropriate, which is connected upstream of the horn or patch antenna used.

The transmitter 111a irradiates the outgoing signal 120a onto the target object 200 and at least a part of that outgoing signal is reflected from the target object 200 and received in a receiver 111b. The signal received in the receiver, likewise having e.g. a horn or patch antenna, is called the incoming signal 120c in the further description.

According to the invention, the incoming signal 120c is supplied to an amplifier 112, which at an output, provides an amplified incoming signal 120d.

According to the invention, the amplified incoming signal 120d is subsequently supplied to a frequency divider 113 which reduces a frequency of the amplified incoming signal 120d by a pre-determinable divider factor x which, at an output of the frequency divider 113, results in the frequency-reduced incoming signal 120d'. In the same manner, the frequency divider 113 is supplied with a reference signal 120b which—like the amplified incoming signal 120d—is subjected to a frequency reduction by the same divider factor x which results in the frequency-reduced reference signal 120b'.

The reference signal 120b has a phase difference with respect to the outgoing signal 120a that is known and, in the present case, assumed to be negligible and is at the same frequency as the outgoing signal 120a. For this reason, the path length difference 2*R between the outgoing signal 120a or the amplified incoming signal 120d and the reference signal 120b brought about by the distance R causes a phase difference between the amplified incoming signal 120d and the reference signal 120b which directly depends on the distance R between the transmitter 111a or the receiver 111b and the target object 200.

From this phase difference, the distance R to the target object 200 can be determined in the known manner subject to knowledge of the frequency f_1 of the outgoing signal 120a. In conventional methods, the sine-shaped outgoing signal 120a only has an accuracy for determining the distance R, which corresponds to the wavelength of the outgoing signal 120a.

To avoid this disadvantage with the method according to the invention, the amplified incoming signal 120d and the reference signal 120b are each reduced in their frequency by the frequency divider 113 by the divider factor x as already described. Based on a frequency f_1 of the signal 120a, 120c, 120d or the reference signal 120b, a new frequency f_1'=f_1/x is obtained for the frequency-reduced incoming signal 120d' and for the frequency-reduced reference signal 120b'.

The frequency divider 113 according to the invention is designed so that the frequency dividing does not influence the phase difference that exists between the amplified incoming signal 120d and the reference signal 120b. This means that the same phase difference between the frequency-reduced reference signal 120b' and the frequency-reduced incoming signal 120d' still exists as before frequency division.

With the frequency division according to the invention, the accuracy in determining the distance R is advantageously magnified by the divider factor x used during frequency division. For example, with a choice of the divider factor of x=16, an accuracy range is advantageously obtained that is likewise magnified by the factory x=16 compared with a distance determination according to conventional methods.

The frequency-reduced reference signal 120b' and the frequency-reduced incoming signal 120d' are, as is evident from FIG. 1, supplied to a phase comparator 114 that, at its output, provides an output voltage 121a that is proportional to the phase difference between the frequency-reduced reference signal 120b' and the frequency-reduced incoming signal 120d'. This output voltage 121a is supplied for digitization to an analogue/digital converter 115 which at its output, outputs a digitized output voltage 121b for further evaluation by for example a computation unit 116 designed as micro controller or DSP. From this, the computation unit 116 determines the distance R to the target object 200.

If an existing system-induced phase difference between the reference signal 120b and the outgoing signal 120a differs from zero—other than in the present case—it can be calibrated-out by calculation because it is constant and can for example be determined through simulations or measurements.

With a particularly advantageous embodiment of the present invention, the outgoing signal 120a, like the reference signal 120b, is generated by an electrically tunable oscillator 110, which is also called VCO (voltage controlled oscillator). The frequency of the outgoing signal 120a or the reference signal 120b in this case is set through suitable selection of an input voltage U_1 supplied to the VCO 110, which for example can likewise take place via the computation unit 116.

A further embodiment of the present invention is described in the following making reference to the flow diagram depicted in FIG. 2.

Figure 2:
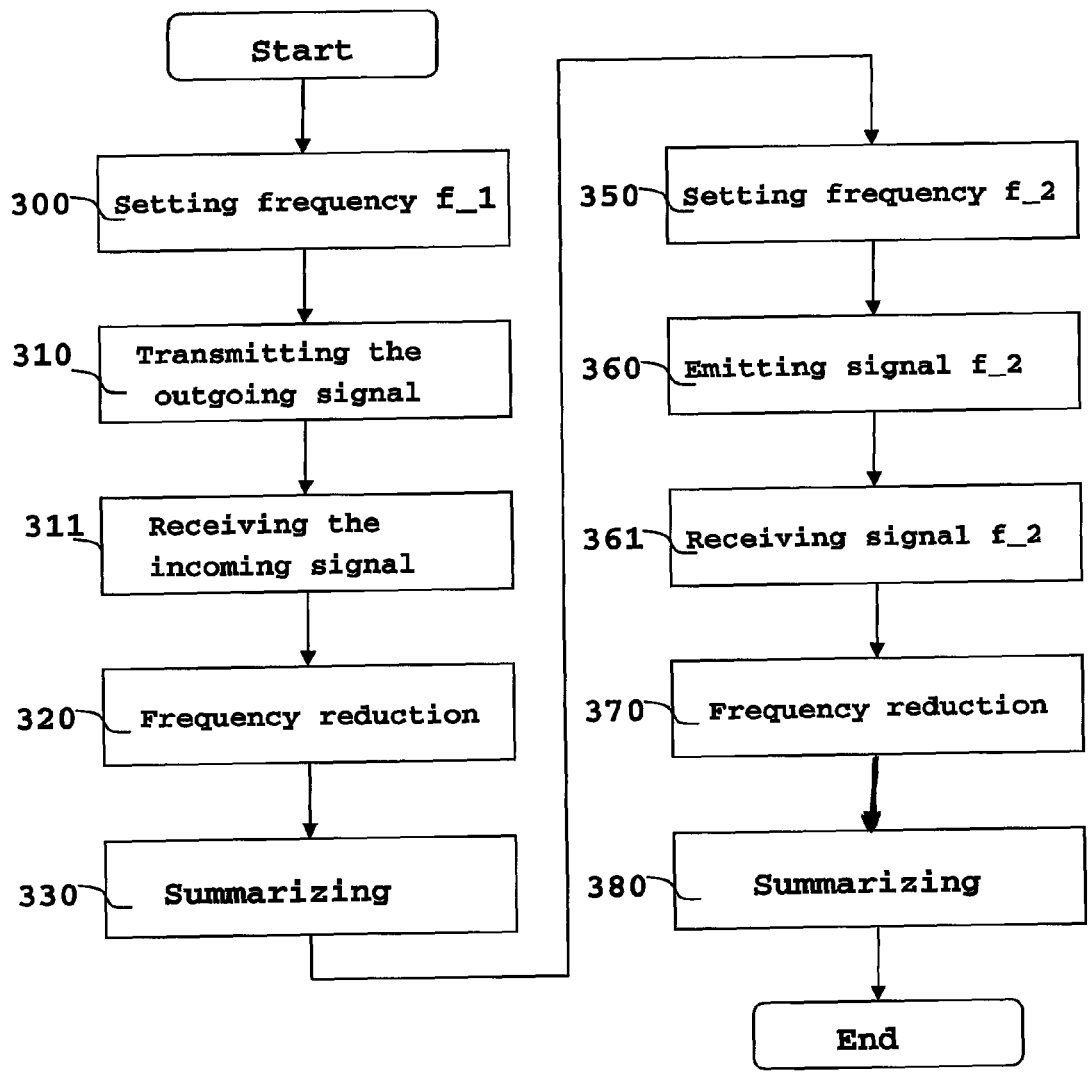
FIG. 2 shows a simplified flow diagram of an embodiment of the method according to the invention.

With the embodiment according to FIG. 2 a first frequency f_1 for the outgoing signal 120a and the reference signal 120b is set in a first step 300 through suitable selection of the input voltage U_1 (compare FIG. 1) of the VCO 110.

After this, the outgoing signal 120a in the step 310 is emitted from the transmitter 111a in the direction of the target object 200 (FIG. 1 right) and in the step 311 received by the receiver 111b as incoming signal 120c and amplified in the amplifier 112.

In the step 320 of the method according to the invention, the amplified incoming signal 120d and the reference signal 120b are reduced by the frequency divider 113, as a result of which a frequency-reduced incoming signal 120d' and a frequency-reduced reference signal 120b' are obtained, both of which have a frequency $f\_1'=f\_1/x$ reduced by the divider factor x of the frequency divider 113.

In the next step 330 shown in FIG. 2, the already described analysis of the phase difference between the frequency-reduced incoming signal 120d' and the frequency-reduced reference signal 120b' and a corresponding determination of the distance R are summarized.

To further increase the precision of the method according to the invention, a second frequency $f\_2$, which differs from the first frequency $f\_1$, is subsequently set for the outgoing signal 120a and the reference signal 120b through suitable selection of the input voltage $U\_1$ (compare FIG. 1) of the VCO 110.

Similar to the steps 310 to 330, the outgoing signal of the frequency $f\_2$ is initially emitted in the step 360 and at least partly received in form of the incoming signal 120c in the step 361 and amplified in the amplifier 112. The frequency dividing according to the invention finally takes place in the step 370, as a result of which a frequency-reduced incoming signal 120d' and a frequency-reduced reference signal 120b' are now obtained both of which have a frequency $f\_2'=f\_2/x$ which is reduced by the divider factor x of the frequency divider 113.

In the next step 380 shown in FIG. 2, the already described analysis of the phase difference between the frequency-reduced incoming signal 120d' and the frequency-reduced reference signal 120b' and a corresponding determination of the distance R are summarized.

By using two different frequencies $f\_1$, $f\_2$ for two successive distance measurements, which, in a general sense, can also be understood as FSK principle (frequency shift keying) a unique determination of the distance R to the target object 200 is made possible. Generally, it is also conceivable to use more than two different frequencies with the method according to the invention.

With a particularly advantageous embodiment of the invention, the incoming signal 120c or the amplified incoming signal 120d and the reference signal 120b are converted into a digital signal prior to frequency dividing in the frequency divider 113. The digital signal can only assume two states: zero and one. The conversion in this case preferably takes place using an Schmitt-trigger or a comparator.

In this way, particularly simple frequency division taking into account the phase difference can take place, for example, via a binary counter. If the divider factor x is suitably selected in size, it is also possible to directly supply the frequency-reduced incoming signal 120d', which is present as a digital signal, and the frequency-reduced reference signal 120b', which is likewise present as digital signal to a computation unit 116, e.g. to a fast DSP. In this case, the DSP can directly determine a phase difference from the signals supplied to the DSP.

On the other hand, the frequency-reduced signals 120b', 120d' which are present as digital signal can also be initially supplied to a phase comparator 114 as depicted in FIG. 1, the phase comparator providing a corresponding output voltage 121a which can be further processed in the manner already described in order to determine the distance R.

A further very advantageous embodiment of the present invention provides that, in the device 100, signal paths for passing on the outgoing signal 120a and/or the incoming signal 120c, 120d and/or the reference signal 120b or further components passing on the signals 120a, 120b, 120c, 120d such as for example the amplifier 112 are formed such that they do not influence a phase difference between the incoming signal 120c, 120d and the reference signal 120b which depends on the distance R. It is thereby ensured that a local line routing in the device 100 for the passing on of the signals 120a, 120b, 120c, 120d or even different signal time delays in the amplifier 112 have no negative effects on the accuracy during the distance determination. Different signal path lengths that actually exist within the device 100 or frequency-dependent signal time delays in the amplifier 112 can also be compensated for in that they are taken into account by the computation unit 116 in determining the distance R.

In contrast with conventional devices, where a coherent demodulation of an incoming signal is carried out using mixers so that a phase difference between an outgoing signal and an incoming signal can also be evaluated, the effort for carrying out the method according to the invention is relatively low, since, in addition to the conventional components, merely the frequency divider 113 (FIG. 1) according to the invention is required. A plurality of oscillators or their synchronization is not required with the present invention as is the case in prior art. On the contrary, the electrically tunable oscillator 110 can run freely with the device 100 according to the invention, i.e. it need not have a given fixed phase relationship to other oscillators or other components.

A further advantage of the present invention consists in that no calibration is required prior to a distance measurement.

In addition to this, distances that are much smaller than one wavelength of the frequency $f\_1$, $f\_2$ of the outgoing signal can be determined with the method according to the invention. For this reason the method according to the invention is more preferably also suitable for distance determination in the field of motor vehicles, where for example obstacles located immediately about the motor vehicle and their distances to the motor vehicle have to be determined.

In general, the method according to the invention can be employed with any existing radar system, which can be augmented by the frequency divider according to the invention. Existing radar systems, which provide frequency shift keying, can likewise be used to carry out the method according to the invention.

More preferably because of the high spatial resolution or spatial accuracy, the object of the invention can also be employed very particularly advantageously with radar-based systems for distance detection in the field of motor vehicles such as park assistance systems, with systems for collision detection and the like.

We claim:

1. A method for determining a distance to a target object, the method comprising the steps of:
    a) transmitting radio frequency electromagnetic waves as an outgoing signal using a transmitter;
    b) receiving, using a receiver, at least a part of the outgoing signal reflected on the target object to generate an incoming signal;
    c) converting the incoming signal and a reference signal into a digital signal;
    d) reducing, using a frequency divider and following step c) while maintaining a phase difference between the reference signal and the incoming signal, a frequency of the reference signal and a frequency of the incoming signal by a same pre-determinable divider factor to obtain a frequency-reduced reference signal and a frequency-reduced incoming signal, wherein the reference signal has a known phase difference with respect to the outgoing signal and a same frequency as the outgoing signal; and e) evaluating, following step d), a phase difference between the frequency-reduced reference signal and the frequency-reduced incoming signal to determine the distance to the target object, wherein an output voltage, which is proportional to the phase difference between the frequency-reduced reference signal and the frequency-reduced incoming signal is obtained from the frequency-reduced reference signal and the frequency-reduced incoming signal using a phase comparator.

2. The method of claim 1, wherein step c) is effected with a Schmitt-trigger or a comparator.

3. The method of claim 1, wherein the incoming signal is amplified to obtain an amplified incoming signal and that amplified incoming signal is supplied to the frequency divider.

4. The method of claim 1, wherein the frequency division takes place by means of a binary counter.

5. The method of claim 1, wherein the output voltage is digitized by an analog/digital converter to obtain a digitized output voltage.

6. The method of claim 1, wherein the output voltage is supplied to a computation unit, a microcontroller, or a digital signal processor for determining the distance.

7. The method of claim 1, wherein the outgoing signal and the reference signal is generated by an electrically tunable oscillator or as a function of an input voltage that is supplied to an electrically tunable oscillator.

8. The method of claim 1, wherein compensation is effected for different path lengths of the outgoing signal that occur within a wave guide or circuitry such as an amplifier of a device used for distance determination and of the incoming signal and the reference signal and other time delay differences of signals.

9. The method of claim 8, wherein the time delay differences are caused by an amplifier provided for amplification of the incoming signal.

10. The method of claim 1, wherein a plurality of outgoing signals with different frequencies are successively emitted.

11. A device for determining a distance to a target object, the device comprising:
   means for transmitting radio frequency electromagnetic waves as an outgoing signal;
   means for receiving at least a part of the outgoing signal reflected on the target object to generate an incoming signal;
   means for converting the incoming signal and a reference signal into a digital signal;
   means for reducing, using a frequency divider and while maintaining a phase difference between the reference signal and the incoming signal, a frequency of the reference signal and a frequency of the digitized incoming signal by a same pre-determinable divider factor to obtain a frequency-reduced reference signal and a frequency-reduced incoming signal, wherein the reference signal has a known phase difference with respect to the outgoing signal and a same frequency as the outgoing signal; and
   a phase comparator, said phase comparator structured for evaluating a phase difference between a frequency-reduced reference signal and a frequency-reduced incoming signal to determine the distance to the target object, wherein an output voltage, which is proportional to the phase difference between the frequency-reduced reference signal and the frequency-reduced incoming signal is obtained from the frequency-reduced reference signal and the frequency-reduced incoming signal using said phase comparator.

12. The device of claim 11, wherein said converting means comprise a Schmitt-trigger or a comparator.

13. The device of claim 11, wherein the frequency divider comprises a binary counter.

14. The device of claim 11, wherein an electrically tunable oscillator generates at least one of the outgoing signal and the reference signal.

15. The device of claim 11, wherein said evaluating means comprises a computation unit, a microcontroller, or a digital signal processor.

16. The device of claim 11, wherein at least one of said transmitting means and said receiving means has a horn antenna or a patch antenna.

17. The device of claim 11, wherein signal paths of the device, further components passing on signals, and means for passing on the outgoing signal, the incoming signal and the reference signal do not influence a phase difference between the incoming signal and the reference signal which is dependent on the distance to the target object.

* * * * *